April 18, 1967     K. J. HERTZ     3,314,842
PLEATING METHOD
Filed Dec. 26, 1962
3 Sheets-Sheet 1
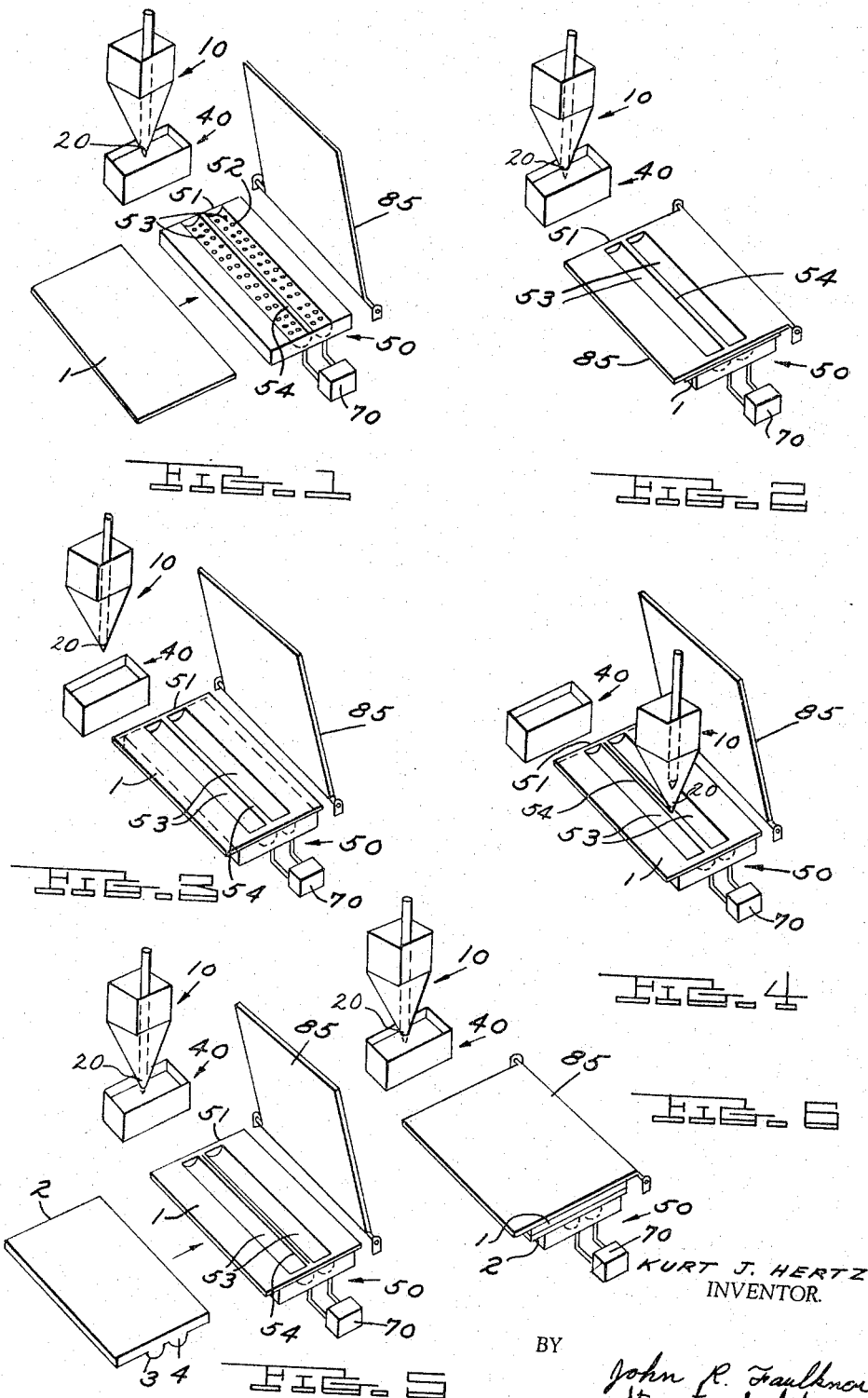
KURT J. HERTZ
INVENTOR.
BY John R. Faulkner
Stuart Lubitz
ATTORNEYS

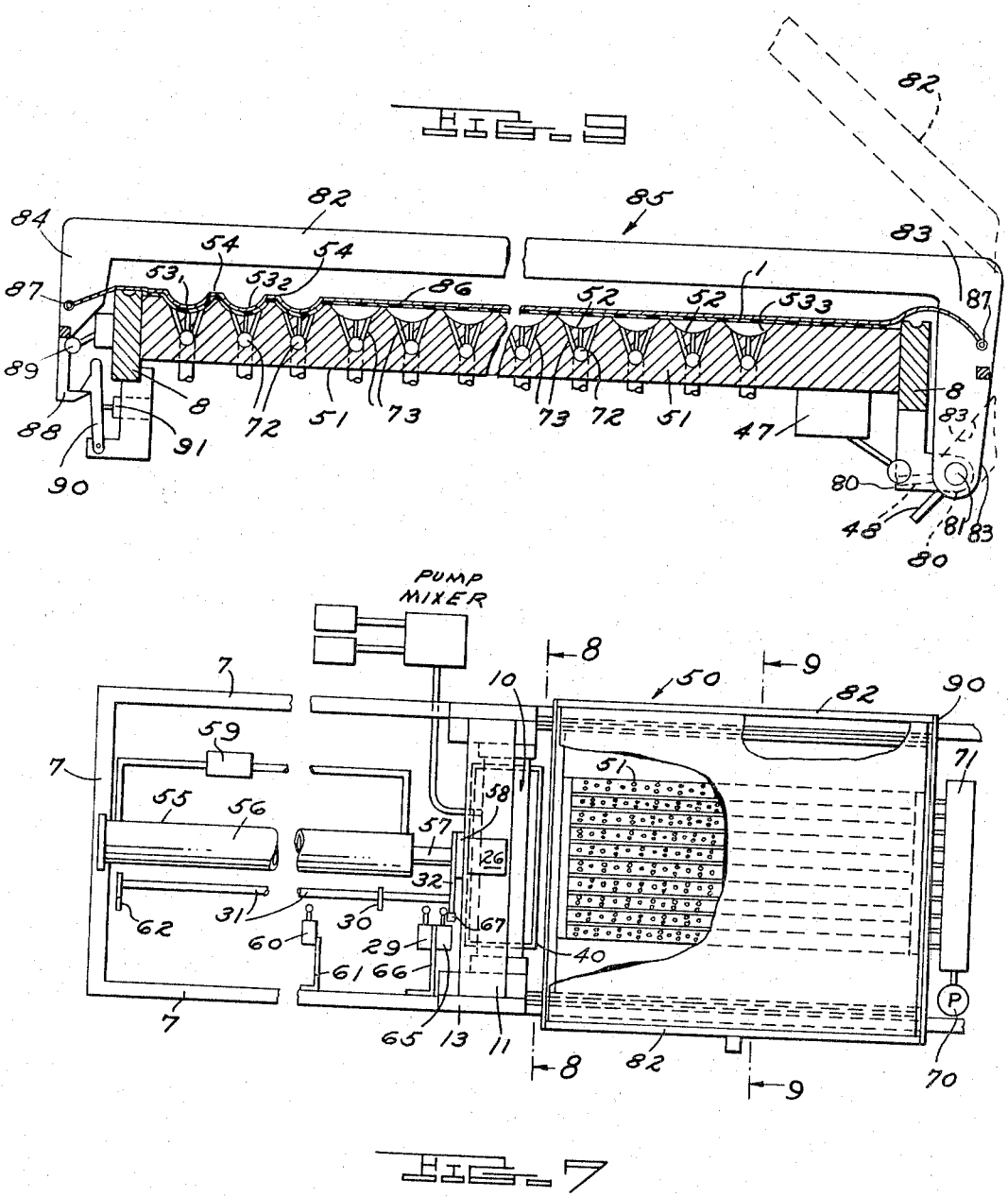

April 18, 1967
K. J. HERTZ
3,314,842
PLEATING METHOD
Filed Dec. 26, 1962
3 Sheets-Sheet 3
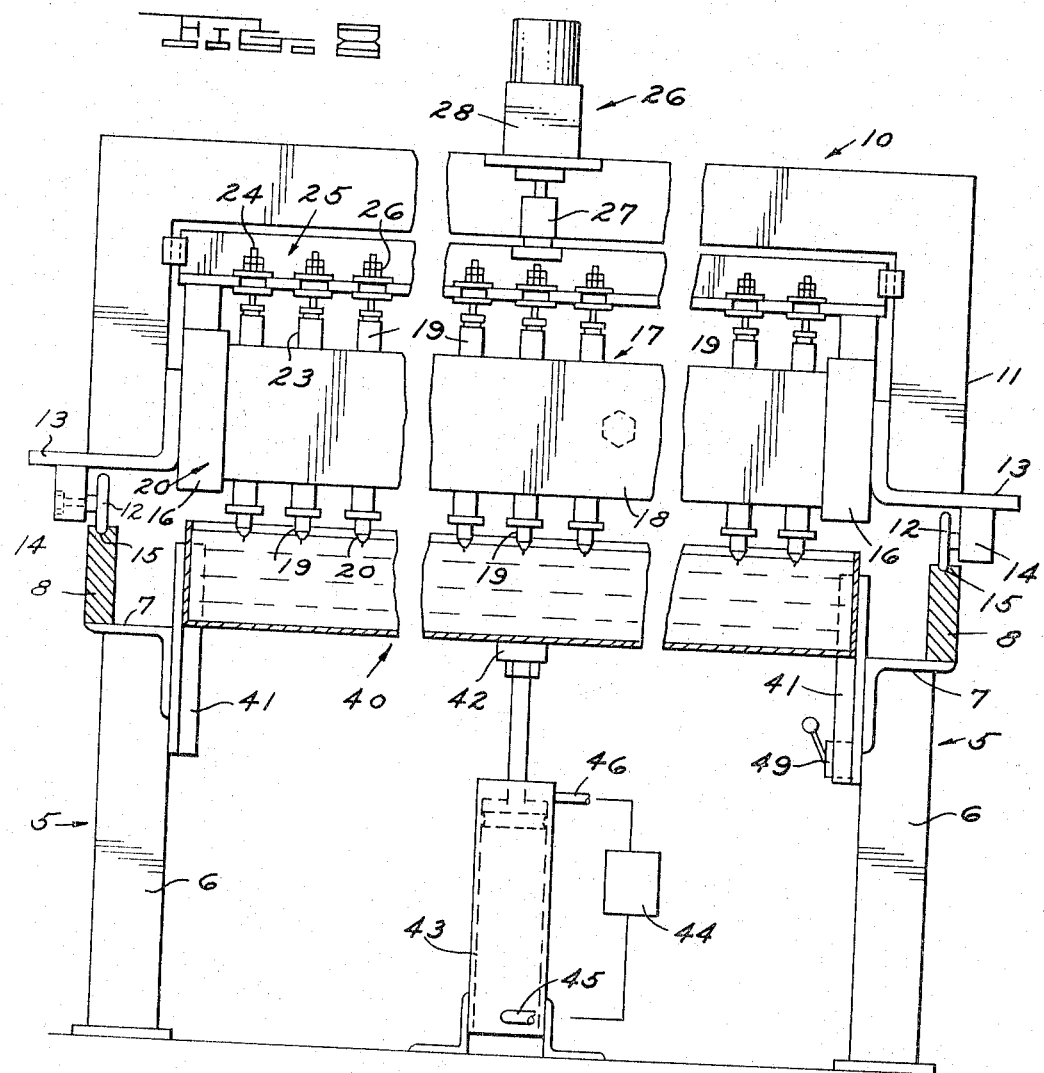
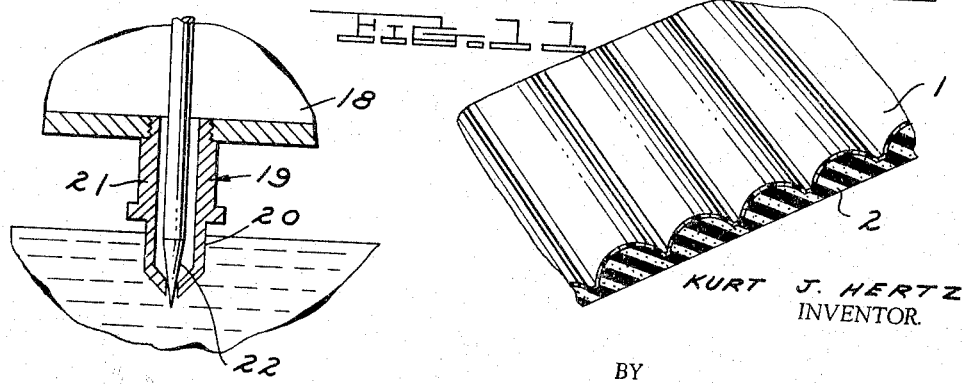
KURT J. HERTZ
INVENTOR.
BY
John R. Faulkner
Stuart Lubitz
ATTORNEYS

United States Patent Office 3,314,842
Patented Apr. 18, 1967

3,314,842
PLEATING METHOD
Kurt J. Hertz, Detroit, Mich., assignor to Ford Motor Company, Dearborn, Mich., a corporation of Delaware
Filed Dec. 26, 1962, Ser. No. 247,083
1 Claim. (Cl. 156—196)

This invention relates to a method and machine for assembling and forming a plurality of flexible members. More particularly this invention relates to a method and machine for assembling a covering material and a cushion or resilient material to form a pleated assembly for the interior of an automotive vehicle.

It is a common practice to form a pleated inserted or assembly of a vinyl material and a rubber material by manually sewing a sheet of vinyl material to a sheet of rubber material having preformed pleats or pipes. In performing the sewing, the operator first aligns the vinyl cover with the pleated rubber material and makes one pass with a single needle sewing machine to initially align the materials. The operator then matches notches located on the ends of both parts and evenly divides the vinyl material over two or three pleats in an effort to form a full and even pleat. With the parts properly aligned and the vinyl material properly proportioned over the preformed pleats, a three-needle pass over the rubber and vinyl materials is made, thus forming a plurality of pleats. This aligning of the vinyl and rubber material and the multiple needle passes continues until the desired number of pleats are formed. The resulting composite member of rubber and vinyl has pleats which vary in fullness and form. In addition the process is slow and tedious and requires a high degree of skill.

The instant invention overcomes the above disadvantages by providing a machine and method for forming, with a minimum of skill, assemblies of vinyl and rubber having uniform pleats. Broadly, the invention comprises forming all of the pleats in the vinyl material, joining the formed vinyl material and a preformed rubber material with an adhesive, and permanently joining the assembly by a multiple needle pass.

The general object of the invention is the provision of an improved machine and method for assembling and forming a member having raised portions.

Another object of this invention is the provision of an improved machine and method for assembling and forming a pleated member.

Another object of this invention is the provision of an improved method for forming a pleated assembly from a preformed resilient member and a sheet of a flexible material.

Another object of this invention is to form uniform pleats in a resilient member.

Another object of the invention is to provide a method whereby a high quality pleated member can be formed with a minimum of operator skill.

Another object of the invention is to provide a machine to form pleats in a flexible sheet member and to bond a pleated resilient member to the formed pleats.

Other objects and advantages will become apparent as the specification is read in conjunction with the figures wherein:

FIGURES 1–6 are simplified diagrammatic representations of the process of forming a pleated flexible member and securing this member to a preformed resilient member.

FIGURE 7 is a schematic plan view of a machine that may be utilized to form the pleats in the flexible member and to join the formed flexible member to a preformed resilient member;

FIGURE 8 is a sectional view taken along the lines 8—8 as indicated in FIGURE 7 and showing the die and sealing means for the die of the forming machine;

FIGURE 9 is a sectional view taken along the lines 9—9 as indicated in FIGURE 7 and showing the adhesive applicator of the forming machine;

FIGURE 10 is an enlarged sectional view of the valve means employed in the adhesive applicator shown in FIGURE 9; and FIGURE 11 is a perspective view of the finished pleated member.

The invented process can be readily understood by referring to FIGURES 1–6. In these figures an adhesive distributor or applicator is schematically represented at 10. In the embodiment of the invention (FIGURES 9 and 10) the adhesive applicator has the capability of delivering a plurality of adhesive streams to the material being formed. This adhesive applicator will be described in detail later in the specification. A tank 40 filled with a fluid or solvent is located adjacent the tip 20 of the adhesive applicator 10. The tip 20 of applicator 10 is adapted to be submerged in the tank 40 either by the movement of the tank 40 or by the movement of the applicator 10. The water or other fluid in the tank 40 serves to remove any adhesive from the tip 20 and thus prevents any adhesive residue from clogging and impeding the distribution of adhesive.

The applicator 10 is adapted to move over the surface of a forming table 50 and to distribute adhesive over a flexible member 1 that has been placed thereon. The flexible member may be made from any flexible material but in the embodiment described it is a covering material such as vinyl. In performing the process, the forming table 50 may be any of the commonly known devices for forming decorative, raised and depressed portions on materials such as vinyl. The described embodiment utilizes a forming table 50 having a die 51 with apertures 52 located over the surface of the die 51 and in particular located in the cavity or depressed portions 53. These apertures 52 are connected to a pressure source 70 which may be a vacuum pump. In the schematic diagrams (FIGURES 1–6), for simplicity's sake, the die has two depressed portions 53 and one raised portion or crest 54. It should be understood that this is only exemplary and, as will be understood later in the specification, the specific embodiments shown in FIGURES 7–10 utilize a plurality of depressed portions 53 and raised portions 54 which cooperate with a multiple stream adhesive applicator 10.

A sealing member 85 is located adjacent to the forming table 50 and is adapted to overlie and seal the die 51 of the forming table 50. When the sealing member 85 is placed over the forming table 50 and a pressure is communicated to the die 51 by the pressure source 70, the die 51 is sealed. The pressure source 70, in the described process, delivers a vacuum pressure to the die 51.

With the above general structure in mind, the process can readily be described. The flexible member 1 to be formed is first placed on the forming table 50 and over the die 51 (FIGURE 1). With the flexible member 1 in place, the sealing member 85 is closed and the pressure source 70 is operated to apply a vacuum pressure to die 51. Operating the pressure source 70 causes the flexible member 1 and the sealing member 85 to be sucked into the depressed portions 53 of the die (FIGURE 2). The pressure source 70 may be connected to valving so that the pressure is applied sequentially to the depressed portions 53. The sequential application of the pressure enables the flexible member 1 to closely conform to the configuration of the die. With the pressure applied and the flexible member 1 in intimate contact with the surface of the die, the sealing member 85 is removed and the flexible member 1 acts as a sealing member and is maintained in a formed position by the applied pressure (FIG- URE 3). The adhesive applicator 10 is now removed from the tank 40 and is moved over the surface of the flexible member 1 to distribute an adhesive (FIGURE 4). The adhesive in this embodiment of the invention is spread over the flexible member 1 along the raised portions 54. After the adhesive has been applied, the applicator 10 is returned to its original position and the tip 20 is submerged in the fluid in tank 40.

A preformed resilient member or a flexible member 2 is now placed on top of flexible member 1 and its raised portions 3 and depressed portions 4 are placed in contact with the depressed portions and raised portions respectively formed in the flexible member 1 (FIGURE 5). The sealing member 85 is again closed and the leakage around and through the flexible member 1 is sufficient to cause the sealing member 85 to urge the preformed resilient member 2 into intimate contact with flexible member 1 and thereby secure the two flexible members together (FIGURE 6). The assembly of the flexible members 1 and 2 is then removed from the die by first disconnecting the pressure supplied by the pressure source 70 and then lifting the sealing member 85 away from the surface of the die 51. The configuration of the assembly after this step as completed is shown in FIGURE 11. This assembly is then finished by passing the joined members 1 and 2 through a multiple needle machine for sewing said members together and thus decorating and more securely fastening the members together.

In FIGURES 7–9 a machine is shown which may be utilized to perform certain steps of the above process. The specific details of the control circuitry of the machine are not described in detail as they do not form part of the instant invention. Suitable circuitry can readily be constructed by reading the specification and reference to any of the well-known control texts such as The Design of Switching Circuits by Keister, Ritchie and Washburn, published in 1951 by D. Van Nostrand Company, Incorporated and the 1956–1957 Master Catalog of Fluid Power Products, compiled by the publishers of the Applied Hydraulic Magazine, 1955. The machine, of course, has other uses aside from the described process and the process may be performed by other nonequivalent apparatus.

The machine shown in FIGURES 7–9 has a frame 5 which includes the legs 6, the horizontal cross member 7 and the rails 8 which are all rigidly connected together by suitable fastening means. The adhesive applicator 10 is mounted on the rails 8 and is adapted to be moved over the surface of the die 51 of the forming table 50 by an actuating means or fluid operated cylinder 55 (FIGURE 7). The actuating means 55 has a cylinder 56 fixed to the frame member 7 and a piston and shaft 57 that are slidably mounted in the cylinder 56 and connected to the adhesive applicator 10 by the fastening means 58.

The adhesive applicator 10 includes a support member 11 that is connected to four rotatably mounted wheels 12 by the angle members 13 and the wheel supports 14. The rotatably mounted wheels 12 are adapted to roll in the grooves 15 provided in the rails 8. One leg of each of the angle members 13 is attached to a cylinder head 16 of the applicator tank 17. The applicator tank 17 also includes a cylinder 18 which is rigidly connected to the cylinder heads 16 by a suitable fluid tight joint. The cylinder 18 has a plurality of valve means 19 mounted along its surface. These valve means extend in a vertical direction through the cylinder 18 and into the tank 40 which in its normal position (shown in FIGURE 8) submerges the tips 20 of the valve means 19 in a suitable fluid or solvent such as water.

The valve means 19 is shown in detail in FIGURE 10. The valve means 19 has a body portion 21 which houses a needle member 22. The needle member 22 extends through the body portion 19, the cylinder 18 and the upper body portion 23 (FIGURE 9) and is secured at its upper end 24 by a suitable fastening means to the operating bar or cam 25 of the operating means 26. The operating bar 25 is similarly attached to all of the valve means 19 located along the surface of the cylinder 18. This operating bar 25 is connected to a fluid cylinder 27 that is in turn connected to a solenoid valve 28. The solenoid valve 28 is controlled by a limit switch 29 (FIGURE 7) that is operated by an abutment 30 attached to the shaft 31. When the abutment 30 operates the limit switch 29, the solenoid 28 will be operated and thereby energize the cylinder 27 so that the operating bar 25 is moved upwardly in a vertical direction. This movement of the operating bar 25 causes the needle members 22 in the valve means 19 to also be moved in an upward direction thus permitting any adhesive in the cylinder 18 to flow through the valve means 19. It should be understood that the abutment 30 is located so that the valve means 19 are not opened until they are above the die 51 and flexible member 1.

The tank 40 is adapted to slide in a vertical direction on the vertical rails 41 that are rigidly attached to the horizontal cross members 7. A moving means such as a fluid cylinder 43 is connected to the tank 40 by connecting means 42. The moving means 43 is capable of moving the tank 40 in a vertical direction along the rails 41. The magnitude of this movement is sufficient to submerge or expose the tips 20 of the valve means 19. The moving means 43 is controlled by a solenoid valve 44 which is connected to a pressure source (not shown) and to the ports 45 and 46 of the moving means. The solenoid valve 44 is controlled in part by the operation of the limit switch 47 (FIGURE 9) which is actuated by an abutment 48 rotated by the movement of the sealing means 85. The movement of the sealing means 85 in a clockwise direction, as shown by the broken lines in FIGURE 9, causes the abutment 48 to operate the limit switch 47 resulting in the energization of the solenoid valve 44 and the movement of the tank 40 in a downward direction.

A limit switch 49 is located adjacent the vertical path of travel of the tank 40 and fixed to the vertical rail 41. The movement of the tank 40 in a downward direction will operate the limit switch 49. This limit switch energizes solenoid valve 59 connected to the actuating means 55 (FIGURE 7) to control the movement of the actuating means 55 in a well-known manner. The movement of the tank 40 in a vertical direction away from the tips 20 of the valve means 19 operates the limit switch 49 causing the solenoid valve 59 to be energized and thus resulting in the actuating means 55 moving the adhesive applicator 10 over the surface of the die 51.

The extent of the horizontal movement of the actuating means 55 is controlled by the limit switches 60 and 65 attached to the frame cross members 7 by the brackets 61 and 66 respectively fixed thereon. The limit switch 60 is actuated by an abutment 62 adjustably mounted on a shaft 31 fixed to a plate 32 which is attached to and moves with the applicator 10 and shaft 57. The limit switch 65 is operated by an abutment 67 adjustably attached to the plate 32. When the adhesive applicator 10 reaches the extremity of its travel over the die 51 the limit switch 60 will be operated by the abutment 62, causing the solenoid valve 59 to reverse the direction of movement of the actuating means 55 and also causing the solenoid valve 28 to move the operating bar 26 and close the valve means 19. The actuating means 55 and adhesive applicator 10 will move in the reverse direction until the abutment 67 operates the limit switch 65 resulting in the solenoid valve 44 being operated to cause the tank 40 to move upwardly. The upward movement of tank 40 operates the limit switch 49 causing the solenoid valve 59 to terminate the pressure supplied to the actuating means 55 thus stopping the movement of the actuating means 55 and the adhesive applicator 10.

Referring to FIGURES 7 and 8 the forming table 50 includes a die 51 which is fixed to the rail members 8. This die has a cavity which includes the depressed portions or pipes 53 and raised portions 54. The depressed portions 53 are connected to a pressure source 70 via a bank of solenoids 71, passageways 72 and 73 and apertures 52. The pressure source 70 may be a five horsepower Ingersoll-Rand vacuum pump. The size of the pump may be modified according to the particular structure of the passageways and according to the material being formed. The bank of solenoids 71 includes a solenoid valve for each passageway 72 which may be controlled by well-known circuitry to sequentially connect the apertures 52 with the pressure source 70. For example, the vacuum developed by the pressure source 70 would first be communicated to the depressed portion 53₁. Then with this pressure maintained a similar vacuum would be applied to the depressed portion 53₂ and so on until a vacuum was communicated to all the depressed portions 53. This sequential programming of the solenoids enables the flexible member 1 to be intimately urged into contact with the depressed portions 53. It should be noted as this occurs, the right side of the flexible member 1 (FIGURE 8) will move to the left. It should be understood that the die 51 may be made from removable sections so that sections may be removed or added in order to accommodate various sizes and shapes of flexible members.

The forming table 50 has an angle member 80 which pivotally receives a pair of extensions 83 on a sealing means 85 at 81 (FIGURE 9). The sealing means 85 includes a rectangular frame 82 that is rigidly attached to the extensions 83. The rectangular frame 82 has a flexible rubber blanket or vacuum membrane 86 which is made from a dental rubber loosely stretched across it and attached to the extensions 83 and 84 by the connecting means 87.

The extension 84 has a latch member 88 fixed to its end which is adapted to operate the limit switch 89 and to abut the locking member 90. When the sealing means 85 is placed in the position shown in FIGURE 8, the rubber blanket 86 overlies the die 51 and the latch member 88 operates the limit switch 89. The operation of the limit switch 89 energizes the solenoid bank 71 causing a vacuum pressure to be sequentially transmitted through the apertures 52. This vacuum causes the rubber blanket 86 to be sucked sequentially into the depressed portions of the die which in turn forms the flexible member 1. When the right end portion of the flexible member 1 (FIGURE 8) conforms to the contour of the die, the sealing means 85 may be opened as the flexible member 1 will then act as a sealing means. The sealing means may be automatically opened when a vacuum pressure is transmitted to the depressed portion 53₃. The transmission of the vacuum to the depressed portion 53₃ via one of the solenoid valves in the solenoid bank causes the solenoid 91 to be operated, thus disengaging the latch member 88 and the lock member 90. This permits the sealing means 85 to swing upwardly as indicated by the broken lines in FIGURE 8. This upward movement can be caused by counter weighting the sealing means 85 or by commonly-known spring arrangements.

In operation a flexible member 1 is first placed in the die 51 of the forming table 50. The sealing means 85 is then manually placed in the horizontal position shown in FIGURE 8. The movement of the sealing means 85 to a horizontal position operates the limit switch 89 causing a pressure to be transmitted to the depressed portions 53 of the die, thus forming the flexible member 1. When a vacuum pressure is transmitted to all of the depressed portions 53, the solenoid 91 is energized freeing the sealing means 85 and thus enabling it to move upwardly. The upward movement of the sealing means 85 causes the abutment 48 to operate the limit switch 47. The operation of the limit switch 47 energizes the solenoid valve 44. The energization of the solenoid valve 44 causes the moving means 43 to move the tank 40 in the downward direction along the vertical rails 41. The movement of the tank 40 in a downward direction operates the limit switch 49 which energizes the solenoid valve 59. The energization of this solenoid valve results in the actuating means 55 moving the adhesive applicator 10 across the surface of the die 51. As the adhesive applicator 10 begins to move over the surface of the die 51, the abutment 30, indirectly attached to the adhesive applicator 10, operates the limit switch 29. The operation of the limit switch 29 energizes the solenoid valve 28 which in turn operates the air cylinder 27 which results in a movement of the operating bar 25 to open the valve means 19. The opening of the valve means 19 permits the adhesive in the cylinder 18 to be distributed over the surface of the flexible member 1. When the adhesive applicator 10 reaches the extremity of its travel, the abutment 62 operates the limit switch 60 which causes a reversal in the direction of travel of the adhesive applicator 10 and simultaneously closes the valve means 19. When the adhesive applicator 10 reaches its original position, a limit switch 65 is operated resulting in the raising of the tank 40 and the termination of the movement by the adhesive applicator 10.

From the foregoing detailed description, it should be obvious that the applicant has provided a simplified method and machine for forming a plurality of flexible members into an assembly having raised and depressed portions. The machine disclosed includes an improved adhesive applicator that may distribute a plurality of adhesive streams to the flexible member that is being formed.

It will be understood that the invention is not to be limited to the exact construction shown and described and that various changes and modifications may be made without departing from the spirit and scope of the invention, as defined in the appended claim. In this claim the word "pleating" is used broadly and includes any configuration having a raised and depressed portion.

I claim:

The method of forming a pleated assembly from a flexible, sheet-like first member having a bonding side and a side opposite and a sheet-like, resilient second member having a preformed surface, comprising the steps of applying a vacuum to said first member and thereby forming a plurality of pleats in said first member, distributing an adhesive over said bonding side of said first member, and bonding said second member to said first member by bringing said preformed surface of said second member into contact with the resulting adhesive-bearing bonding side of said first member while said first member is held in pleated configuration by said vacuum, said preformed surface being shaped to conform with the bonding side of said first member after the pleating thereof.

References Cited by the Examiner

UNITED STATES PATENTS

| | | | |
|---|---|---|---|
| 1,996,728 | 4/1935 | Mitchell | 112—2 |
| 2,116,102 | 5/1938 | Darlington | 45—138 |
| 2,155,445 | 4/1939 | Pittenger et al. | 53—22 X |
| 2,338,490 | 1/1944 | Cunnington | 156—79 |
| 2,781,087 | 2/1957 | Dovidio | 156—382 |
| 2,910,762 | 11/1959 | Priester | 161—62 |
| 2,915,427 | 12/1959 | Schriner et al. | 156—214 |
| 3,025,208 | 3/1962 | Geiger | 156—382 |
| 3,083,495 | 4/1963 | Quakenbush | 45—138 |
| 3,265,551 | 8/1966 | Ananian et al. | 156—219 |

FOREIGN PATENTS 834,454  5/1960  Great Britain.

EARL M. BERGERT, *Primary Examiner.*

JORDAN FRANKLIN, *Examiner.*

J. BOLER, H. F. EPSTEIN, *Assistant Examiners.*